United States Patent
Eberlein et al.

(10) Patent No.: US 10,291,704 B2
(45) Date of Patent: May 14, 2019

(54) NETWORKED SOLUTIONS INTEGRATION USING A CLOUD BUSINESS OBJECT BROKER

(71) Applicants: Peter Eberlein, Malsch (DE); Bare Said, Sankt Leon-Rot (DE)

(72) Inventors: Peter Eberlein, Malsch (DE); Bare Said, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 937 days.

(21) Appl. No.: 13/927,473

(22) Filed: Jun. 26, 2013

(65) Prior Publication Data

US 2015/0006608 A1 Jan. 1, 2015

(51) Int. Cl.
*H04L 29/08* (2006.01)

(52) U.S. Cl.
CPC .......... *H04L 67/1097* (2013.01); *H04L 67/16* (2013.01)

(58) Field of Classification Search
CPC ......... H04L 67/10; H04L 67/16; H04L 67/28; H04L 67/1097; G06Q 10/10; G06F 17/30575
USPC ........................................................ 709/202
See application file for complete search history.

(56) References Cited

U.S. PATENT DOCUMENTS

| | | | |
|---|---|---|---|
| 7,565,443 B2 | 7/2009 | Rossmanith et al. | |
| 7,958,186 B2 | 6/2011 | Kol et al. | |
| 8,010,972 B2 | 8/2011 | Das | |
| 8,032,397 B2 | 10/2011 | Lawless | |
| 8,146,102 B2 | 3/2012 | Gaffga | |
| 9,015,324 B2* | 4/2015 | Jackson | G06F 9/5027 709/201 |
| 2002/0107957 A1* | 8/2002 | Zargham | G06Q 10/06 709/224 |
| 2002/0178170 A1 | 11/2002 | Britton et al. | |
| 2005/0044197 A1* | 2/2005 | Lai | G06Q 10/10 709/223 |
| 2008/0155014 A1 | 6/2008 | Gaffga | |
| 2010/0161682 A1 | 6/2010 | Pfeifer et al. | |
| 2011/0145526 A1* | 6/2011 | Parham | G06F 3/061 711/162 |
| 2011/0213691 A1* | 9/2011 | Ferris | G06F 9/44505 705/37 |
| 2012/0011077 A1 | 1/2012 | Bhagat | |
| 2012/0131101 A1 | 5/2012 | Said et al. | |

(Continued)

OTHER PUBLICATIONS

"Connect and Engage with Customers in the Cloud with SAP HANA Cloud Platform, Deliver Impactful Web Experiences, Delight Users, and Meet Any Musiness Need", SAP HANA Cloud Platform, (2013), 4 pgs.

(Continued)

*Primary Examiner* — Larry D Donaghue
*Assistant Examiner* — Patrick F Ngankam
(74) *Attorney, Agent, or Firm* — Schwegman Lundberg & Woessner, P.A.

(57) ABSTRACT

Methods, systems, and computer program products for transferring business objects and business object data are described. A business object from a first networked service may be obtained. The business object may be stored in a cloud business object broker and may be transferred to a second networked service. The business object may be deleted from the cloud business object broker after a transferal from the cloud business object broker to the second networked service.

16 Claims, 9 Drawing Sheets

(56) References Cited

U.S. PATENT DOCUMENTS

| | | | |
|---|---|---|---|
| 2012/0158821 A1* | 6/2012 | Barros | G06F 17/30563 709/203 |
| 2012/0197718 A1 | 8/2012 | Martchenko et al. | |
| 2013/0097122 A1* | 4/2013 | Liem | G06F 17/3089 707/689 |
| 2013/0132445 A1* | 5/2013 | Koppenhagen | G06Q 10/06 707/810 |

OTHER PUBLICATIONS

"SAP Integration Made Easy", Dell Boomi, (2012), 2 pgs.

Lehmann, Carl, "Dell Boomi reaches a milestone: Hey, SIs and cloud hosts—consider it a wakeup call", The 451 Group, (Feb. 21, 2013), 6 pgs.

* cited by examiner

NETWORKED SOLUTIONS INTEGRATION USING A CLOUD BUSINESS OBJECT BROKER

FIELD

The present disclosure relates generally to providing services. In an example embodiment, the disclosure relates to utilizing a cloud business object broker to integrate networked solutions.

BACKGROUND

Application integration is a major cost factor in the total cost of operations of business applications. The networked solutions concept addresses this challenge by, for example, providing pre-defined and auto-configured integration services for common business scenarios that may be accessible via a network. A number of services (solutions) may be networked together and provided as an integrated landscape. Nevertheless, there may be touch points between business applications that arise ad hoc and cannot be predetermined and prepackaged into a business scenario. Such touch points are often in the form of business objects (such as master data) and can be as simple as the need to copy customer data, such as name, address and the like, from one system to another.

In such situations, a user may need to copy and paste data, field-by-field, from one application into another application or, in the case of heterogeneous devices, a user may even need to re-enter data on one device or into one application that was obtained from another device or application.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
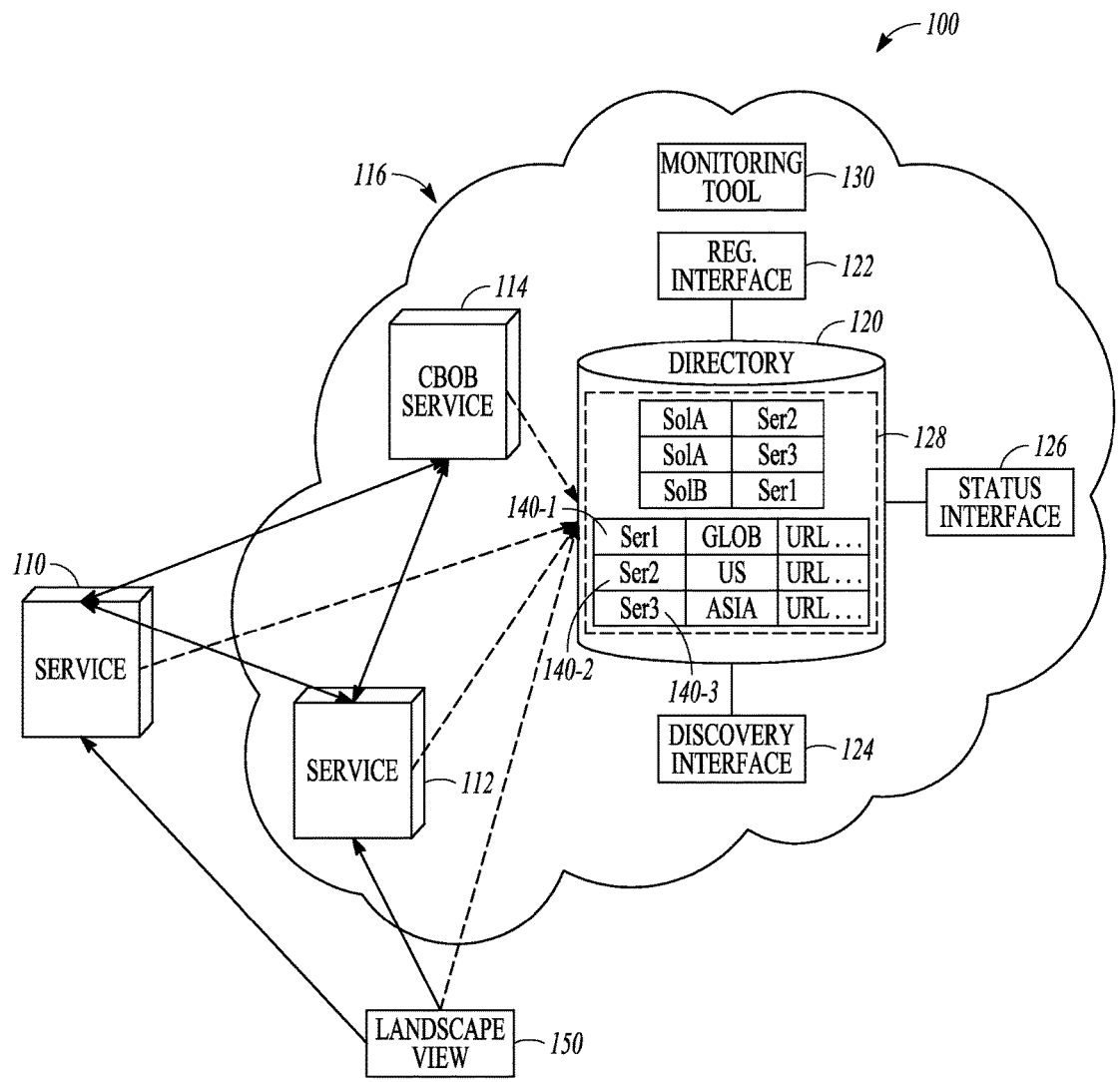
FIG. 1 illustrates a schematic diagram of an example system comprising networked services and a cloud solution landscape directory, in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for integrating networked solutions are described. In one example embodiment, a cloud business object broker (CBOB) may provide a central service in the cloud that enables users and/or networked services to store and retrieve business objects that need to be copied or moved from one networked service to another networked service. In one example embodiment, a CBOB service may enable the transfer of a business object between users and/or networked solutions. The business objects may be transiently stored in the CBOB and may be deleted after use.

The disclosed methods, systems, apparatus, and computer program products may provide for a lightweight integration of networked solutions beyond predefined integration scenarios on the level of business objects and may offer customers the ability to integrate cloud and/or on-demand products into the customers' system landscape(s). The disclosed methods, systems, apparatus, and computer program products may be universally applicable independent of deployment models and client technologies, and may be suited for heterogeneous networked solutions landscapes. In one example embodiment, any number of networked solutions, any type of deployment model (such as on premise and/or in cloud), and any client technology (such as native desktop client, browser interface, mobile application, and the like) may be utilized in a landscape environment.

In one example embodiment, a business object may be a software model representing items used during the transaction of business. For example, a business object may represent a business document such as a sales order, a purchase order, an invoice, and the like. A business object may also represent items such as a product, a business partner, a piece of equipment, and the like. Particular documents (e.g., SalesOrder 50435539) and/or items (e.g., ACME Corporation) may be represented by instances of their representing business object, or business object instances.

The cloud business object broker may be pre-integrated in a networked solutions landscape. The cloud business object broker may leverage a cloud solution landscape directory (CSLD) and a metadata model repository, described more fully below. The cloud business object broker may enable a user to perform "ad hoc" exchange of business object instances and/or business object data between networked services and/or users.

A CBOB service using a cloud business object broker may be included in a service directory. For example, the CBOB service may be included in an instance of the cloud solution landscape directory produced by SAP of Walldorf, Germany. Business object types registered for the CBOB service may be looked-up in the CSLD. Additional business object types that are not already listed may be registered with the CSLD. The business object type registration may include metadata that describes a structure and data type(s) of the corresponding business object type.

The disclosed methods, systems, apparatus, and computer program products may maintain data in the cloud solution landscape directory. In one example embodiment, a method may maintain data regarding multiple individual landscapes, with each landscape of the multiple individual landscapes identifying at least a set of applications. The set of applications of at least one of the multiple individual landscapes may include at least one cloud-based application available for cloud-processing, the at least one cloud-based application being available for access and use. The method may also include processing at least one of a plurality of service requests based, at least in part, on the data regarding the multiple individual landscapes maintained in the cloud solution landscape directory.

The methods, systems, apparatus and computer program products described herein may enable service applications to operate with other applications (e.g., running on the same, or different, nodes as a single solution), operating with SAP and non-SAP applications, and operating with on-demand and on-premise applications. The methods, systems, apparatus and computer program products described herein may also enable integration with existing applications and may require minimal configuration and development efforts. The methods, systems, apparatus and computer program products described herein may further enable development and implementation of monitoring and administration tools for cloud-based business solutions, and may further support lifecycle management and monitoring tools to monitor executing solutions.

The methods, systems, apparatus and computer program products may further include communicating access data relating to accessibility of applications identified in the cloud solution landscape directory, maintaining at least some of the access data in the cloud solution landscape directory, and accessing an application identified in the cloud solution landscape directory based, at least in part, on the access data maintained in the cloud solution landscape directory.

At least one of the multiple individual landscapes in the cloud solution landscape directory may further include, for an application identified in the at least one of the multiple individual landscapes, at least one of, for example, location information to identify a network location of the application, release and version information for the application, usage type for the application, role information for the application, and the like.

In one example embodiment, the method may further include registering an application in at least one landscape in the cloud solution landscape directory. The registration may include providing information on at least one of, for example, location information to identify a network location of the application, release and version information for the application, usage type for the application, role information for the application, and the like.

Processing a service request may comprise accessing, in response to a service request for a particular customer, a landscape from the multiple individual landscapes associated with the particular customer, and determining at least one application from the applications identified in the accessed landscape associated with the particular customer to process the service request. The method may further include processing the service request using the determined application by performing at least one of, for example, accessing an instance of the determined application, the instance of the determined application being configured to enable multi-tenancy operations, and/or invoking a separate instance of the determined application to individually serve the service request.

In one example embodiment, a set of applications identified in one of the multiple individual landscapes may include, for example, an on-premise application and/or an on-demand application.

The on-premise application may be configured to execute on a server connected to a private network accessible by a customer associated with one of the multiple individual landscapes.

The cloud solution landscape directory may be run from one of, for example, an on-demand application and/or an on-premise application.

In one example embodiment, a landscape in the landscape directory that is associated with a particular customer may identify customer-specific (e.g., executing on customer-dedicated servers) and shared applications (e.g., executing on cloud-based servers) that the particular customer can access and use.

In one example embodiment, the method may also include communicating access data relating to accessibility of applications identified in the cloud solution landscape directory, maintaining at least some of the access data in the cloud solution landscape directory, and accessing an application identified in the landscape directory based, at least in part, on the access data maintained in the cloud solution landscape directory.

FIG. 1 illustrates a schematic diagram of an example system 100 comprising networked services and a cloud landscape directory, in accordance with an example embodiment. The system 100 may include a CBOB service 114 and multiple service applications (also referred to as "networked services"), such as networked services 110, 112 that may be distributed in a network and may be accessed by customers to process customers' requests and tasks. The networked services 110, 112 may be hosted by multiple distributed servers that are interconnected via a network (such as the public Internet, private networks, virtual private networks, and the like). The networked services 110, 112 may be on-demand applications (e.g., applications that levy a charge based on use of the applications by customers), or conventional distributed applications that customers may have licenses for. In one example embodiment, at least one of the service applications (e.g., service application 112) may be a cloud-based application configured for cloud processing and may be available for use by multiple customers. In one example embodiment, at least one application (e.g., networked service 110) may be an on-premise application executing, for example, on a private network (which may be part of the cloud or separate from the cloud). Although two networked services 110, 112 are depicted in FIG. 1, any number of service applications may be used.

As further depicted in FIG. 1, the system 100 may include a landscape view 150. The landscape view 150 may be an instance/component of monitoring tools, such as a monitoring tool 130, and may provide a holistic overview of a customer system landscape(s) involved in a cloud solution (s). The landscape view 150 may enable viewing the data maintained in the cloud solution landscape directory 120. Additional application services may be invoked to get more detailed information about the system landscape(s).

The cloud solution landscape directory 120 may enable automatic connection of pre-defined and pre-developed components (e.g., components that include other applications and tools) of systems, including customer-specific systems, on-demand systems, and the like. Such system management functionality may be enabled, at least in part, through use of a bundle of interfaces to provide customers access to the customers' shared and private landscape data in the landscape directory 120. Thus, in one example embodiment, the landscape directory 120 may be configured to maintain individual landscape data for various customers, where each landscape defines a customer's individual system, e.g., the identity of a set of applications. For example, landscape data for one customer may define that customer's landscape as including networked services 110, 112, while another customer's landscape data may define that customer's system as including only service application 112. In one example embodiment, the cloud solution landscape directory 120 may be implemented on one or more storage devices (which may be distributed), and may be managed or controlled by a commercial or customized data management application. The cloud solution landscape directory 120 may be on-premise (and thus may be run from a customer's on-premise system or sub-system) or may be run from an on-demand platform using an application (e.g., a directory software application) as a service in hosted mode.

Landscape data in cloud solution landscape directory 120 may also include data that defines the connectivity between various applications, and may define separate connectivity configurations for the various customers that use the identified applications. For example, the landscape data may set which services may communicate with each other (e.g., to transfer data, requests, commands, and the like), whether service applications may automatically initiate peer-to-peer communications with other service applications without seeking a customer's input, and the like.

Landscape data maintained in the client solution landscape directory 120 may further comprise registration information for the various service applications 110 & 112, including basic information pertaining to the service applications 110 & 112, such as the location of service applications 110 & 112 (provided, for example, as a uniform resource locator (URL) and the like), the release version of the service applications 110 & 112, the applications' role(s) (e.g., human capital management applications, customer relationship management applications, and the like), usage type (e.g., whether the application is used for testing or in the course of production), price/charge information, and the like. In one example embodiment, registration information for a service application 110 or 112 maintained in the client solution landscape directory 120 may be provided via an interface (e.g., a registration interface 122). The registration information may be provided by the services, and/or may be provided, under some circumstances, by the customers (e.g., in situations in which the system to be registered is a test system). In one example embodiment, the registration information may be included in each of the individual landscapes for the various multiple customers where the respective service applications 110 & 112 are listed, and/or may be maintained in the client solution landscape directory 120 as a global data record (providing information for the respective applications).

The cloud solution landscape directory 120 may also be accessed through a discovery interface 124 that enables customers to retrieve information, such as the registration information. Information retrieved via the discovery interface 124 may thus be used by customers to subscribe to additional service applications 110 & 112 with respect to service applications 110 & 112 whose registration information was retrieved via the discovery interface 124, and to modify and/or edit a customers' landscape data (e.g., add or delete particular service applications 110 & 112, change landscape configurations, and the like).

The client solution landscape directory 120 may also maintain access data pertaining to the accessibility of the service applications 110, 112. The access data may be communicated to the cloud solution landscape directory 120 via, for example, a status interface 126 and/or the registration interface 122. Access data may include, for example, status and availability information for the various service applications 110, 112. Access data may be received from administrators (e.g., of the cloud, of private networks connected to the cloud, of the service applications 110, 112 available on the cloud, and the like), from the service applications 110, 112 themselves, and/or from customers. Examples of access data may include status/availability information, information as to whether service applications 110, 112 are active, information as to whether downtime is scheduled for any service application 110, 112, lifecycle status information, and other such information. Lifecycle status information may include an indication of whether the service application 110, 112 has been released, is obsolete, has been replaced by another service application 110, 112, and the like.

As shown in FIG. 1, landscape data, including registration data, access data, and the like, may be arranged in data records that are stored in the customers' (or tenants') individual landscape(s) in the client solution landscape directory 120. For example, the client solution landscape directory 120 may include an example landscape 128 which may include multiple records defining the associated customer's system (any number of records may be included in a given landscape 128). The example landscape 128 may be stored in a logical area in memory allocated to store data for that landscape 128.

For example, FIG. 1 shows three records 140-1-140-3 included within the landscape 128 that hold information, such as registration information, for the service applications 110,112 depicted in FIG. 1. The record 140-1 may include information such as the identity of the service application 110, namely "ser1" (the abbreviation for the networked service 110), an indication that the networked service 110, 112 may include region or country-specific data, and information about the location of the networked service 110, 112 (e.g., its URL). In this case, the service application 110 "ser1" may include data from anywhere in the globe. Any of the records 140-1-140-3 may include additional data, including status/availability information, other types of registration information, and the like. Additional information that may be included in at least some of the records 140-1-140-3 may be the business usage of the system (e.g., customer relationship management (CRM), or human capital management (HCM) Systems).

In one example embodiment, a collection of several callable services may be bundled together to define a solution for which there may be a record in a landscape. Defining a bundle of services in the landscape directory 120 as a solution may enable monitoring customers' systems at a "solution-level" and not just at a "service level".

Figure 2:
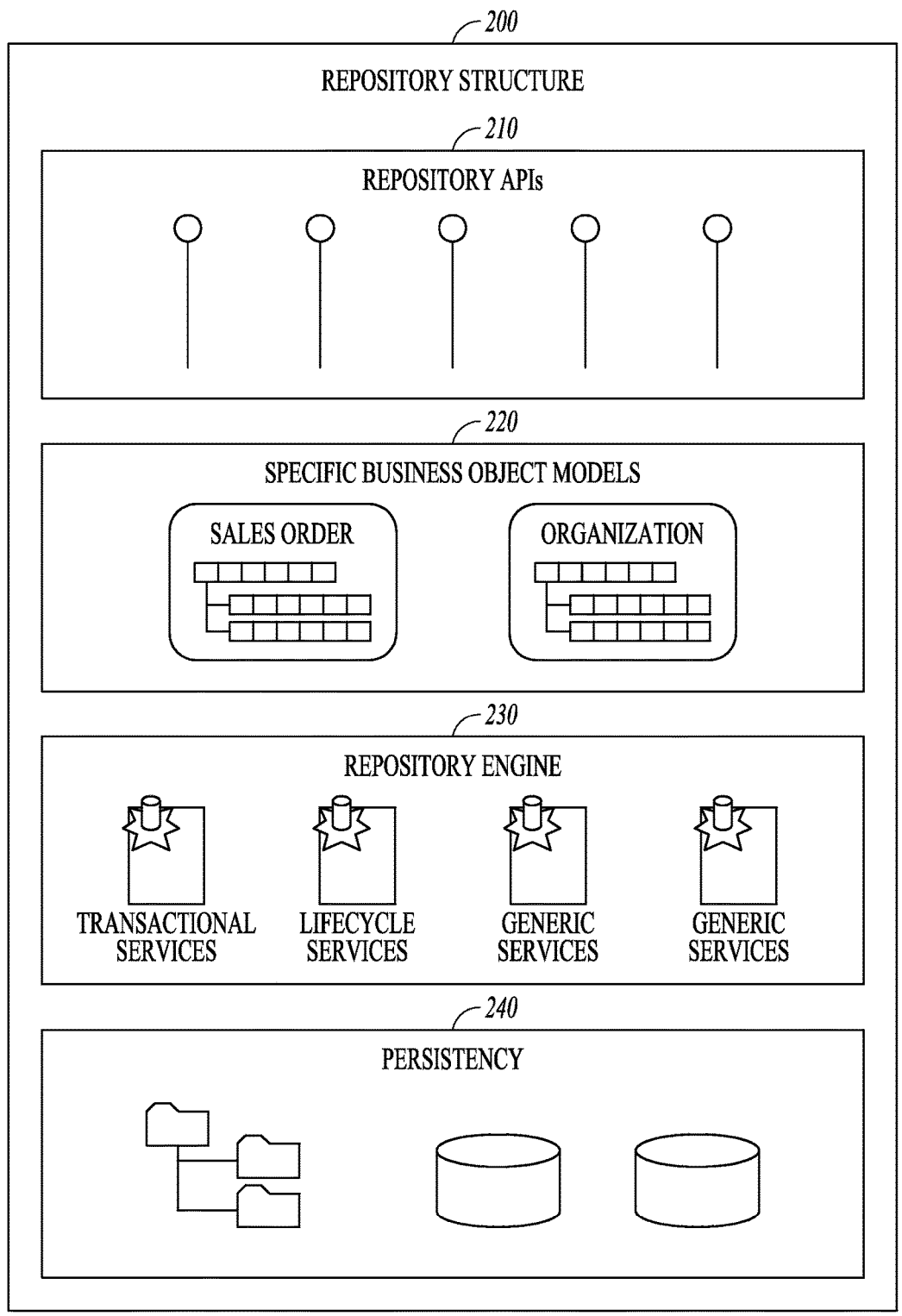
FIG. 2 illustrates an example repository architecture for supporting the use of example business object models and instances thereof, in accordance with an example embodiment.

FIG. 2 illustrates an example repository architecture 200 for supporting the use of example business object models and instances thereof, in accordance with an example embodiment. The repository architecture 200 may comprise a business process platform such as the Application Platform provided by SAP of Walldorf, Germany.

The repository architecture 200 may include application programming interfaces 210 which may provide read and write access to business object instances. The business object instances accessed via application programming interfaces 210 may be instances of specific business object models 220. Each of the specific business object models 220 may comprise metadata describing a specific business object model 220, or class.

A repository engine 230 may include transactional services to create and administrate business object instances, and to provide lifecycle services to manage business object instance lifecycles. Some services of the repository engine 230 may provide the access to business object instances exposed by application programming interfaces 210. The business object instances themselves may be stored in a persistency 240, which may comprise any suitable type(s) of structure(s).

In one example embodiment, each of the specific business object models 220 may conform to a generic business object model (i.e., a meta-metadata model). As a result, the same application programming interfaces 210, the services of the repository engine 230, and the persistency 240 may be used for all instances of the specific business object models 220. The foregoing synergies may facilitate the use of object instances of any newly-developed specific business object model.

Figure 3:
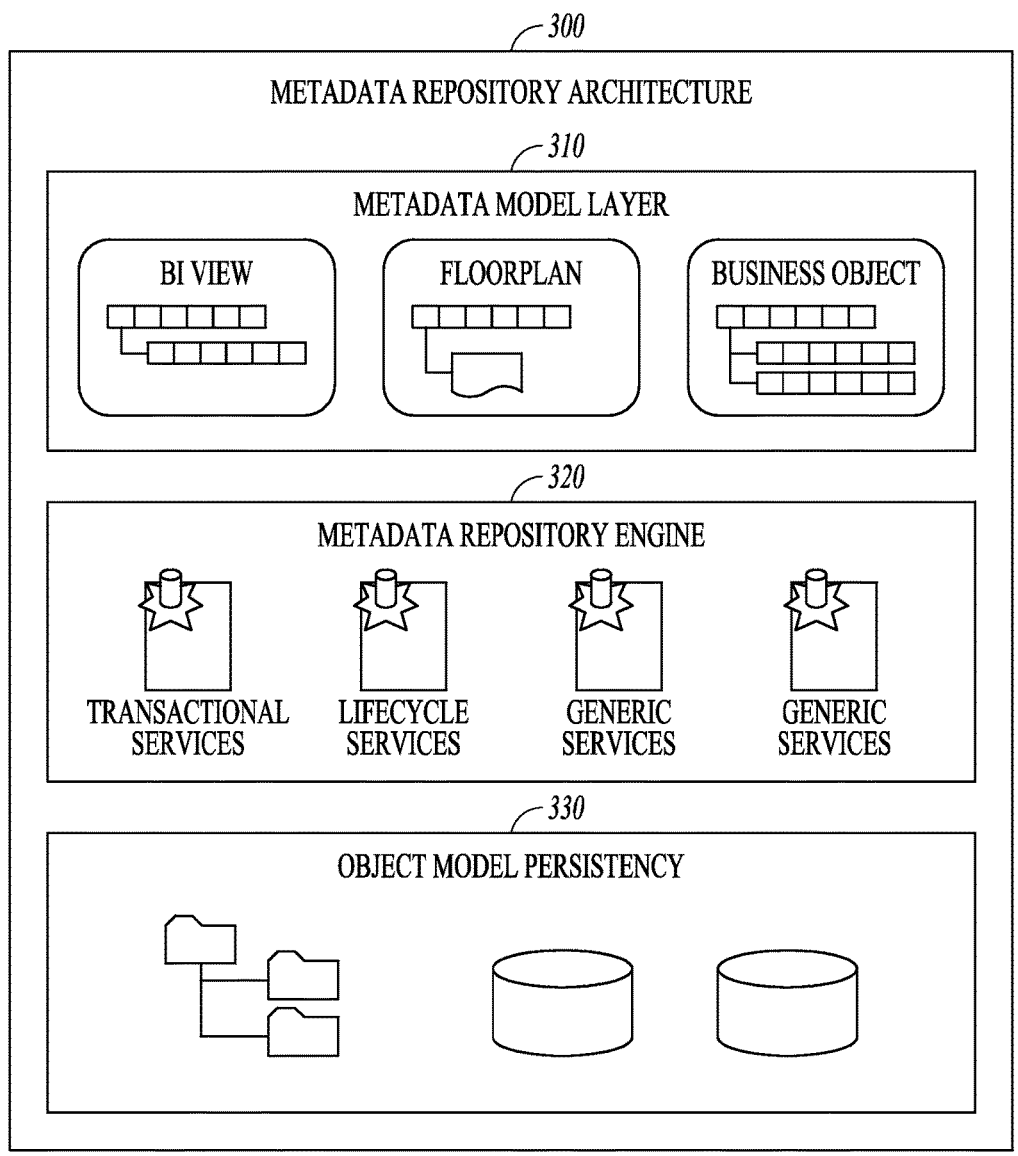
FIG. 3 is a block diagram of an example metadata repository architecture, in accordance with an example embodiment.

FIG. 3 is a block diagram of an example metadata repository architecture 300, in accordance with an example embodiment. FIG. 3 represents a logical architecture for describing some embodiments, and actual implementations may include more or different components arranged in any manner. The metadata repository architecture 300 may be implemented using any number of computer devices, metadata models, object models and/or model instances and may be embodied in any type(s) of electronic data structure(s), and one or more processors may execute program code to perform processes described herein.

The metadata repository architecture 300 may include a metadata model layer 310 and may include metadata models describing, respectively, generic models of a business intelligence (BI) view, a floorplan (i.e., a user interface (UI) layout), and a business object. An instance of the business object metadata model, for example, may comprise the SalesOrder object model or the Organization object model of FIG. 2. The metadata models of layer 310 may be embodied in any type of data structure, including but not limited to eXtensible Markup Language (XML) files. Other metadata models that may reside in metadata model layer 310 may describe, for example, a work center, UI texts, and process components, but embodiments are not limited thereto. Metadata repository engine 320 may provide similar services to repository engine 230. Data structures representing the specific object models may be stored in object model persistency 330.

The metadata may be replicated from an optional metadata model repository of the registering networked solution and may be identical to the metadata used internally in the networked solution or may be a variant of the internal metadata suitable for a generic use among a plurality of networked solutions that exist in the landscape 128. In the latter case, the networked solution may need to transform the internal metadata structure of a particular networked solution to a generic external structure when communicating with the CBOB service 114. The cited transformation may also be needed for networked solutions that access a registered business object type whose metadata is different from its internal definition of a metadata structure.

In one example embodiment, the CSLD 120 may provide a registry service that may be used by the CBOB service 114 to register itself as a service, may provide a lookup service that may be used by a networked service 110, 112 to detect the CBOB service 114, may provide a service to register a business object type and metadata that may be used by the networked services 110, 112 under the CBOB service 114, and may provide a lookup service to lookup a business object type that may be used by the networked services 110, 112 to lookup a business object type and metadata under the CBOB service 114.

The cloud business object broker service 114 may transiently store a business object. For example, the CBOB service 114 may transiently store a business object to enable the networked services 110, 112 to pass the stored business object to one or more other networked services 110, 112. In one example embodiment, the business object types and metadata of supported business objects may be registered in the CSLD 120. The data format of a registered business object may correspond to the structure and data type definition of the registered business object type.

In one example embodiment, business objects may be stored per user. In one example embodiment, authentication and access control in a networked solutions landscape may be used to ensure that, by default, the business objects of a user may not be accessed by other users without proper authorization. In one example embodiment, a user may export business object data to one or more other target users (or a group of target users) in order to share data. In this case, the business object data may be stored for the target user(s) and the same authentication and access control mechanisms used for the target user's other business objects may apply.

In one example embodiment, business object data may be set to expire after a predefined period of time set by, for example, the user. The predefined period of time may be restricted to the limits allowed by a system administrator. For example, a typical timeframe set by an administrator may be eight to ten hours. In this case, data of one working day may expire before the next day starts (independent of time zones). In one example embodiment, a fixed expiration time (e.g., midnight) may be set. For example, companies that are not working across time zones may choose to select a fixed expiration time. Users may further limit the maximum expiration time to fit their work style. For example, a user may set an expiration timeframe of one hour to limit the number of business objects stored in the CBOB service 114 at any point in time.

In one example embodiment, business object data may be copied to one or more target networked services 110, 112. In one example embodiment, business object data may be moved to one or more of the target networked services 110, 112. In the former case, the data may remain in the CBOB service 114 after the business object data has been copied to the target networked solution. In the latter case, the data may be removed from the CBOB service 114 substantially immediately after the data has been obtained by one or more of the target networked services 110, 112. The choice between these two options may be made by, for example, the user of the target networked services 110, 112.

In one example embodiment, a single operation may be defined that transfers a plurality of business objects, or the data of a plurality of business objects, in the CBOB service 114 to one or more other networked services 110, 112, or from one of the networked services 110, 112 to one or more other networked services 110, 112 via the CBOB service 114. The plurality of business objects, or the data of a plurality of business objects, may be defined in a list. In one example embodiment, a user may initiate the transfer of the business object.

In one example embodiment, the CBOB service 114 may store one or more business objects of a certain business object type, may store a list of business objects of a certain business object type, may retrieve a business object of a certain business object type, may retrieve a list of business objects of a certain business object type, may delete a stored business object of a certain business object type, may delete a list of stored business objects of a certain business object type (delete list of business objects), may set a maximum expiration timeframe or an expiration time (set by, for example, an administrator), and may set a user expiration timeframe or an expiration time (set by, for example, a user).

Networked Services

In one example embodiment, the networked services 110, 112 may be configured to provide a functionality of transferring business objects from one of the network services 110, 112 to another of the network services 110, 112. One or both of the networked services 110, 112 may be accessible via a user interface.

In one example embodiment, one or more of the networked services 110, 112 may look up which business object types are supported by the CBOB service 114 to determine which business object types the networked services 110, 112 may have to support. For example, the networked services 110, 112 may support storage to and/or insertion of one or more business object types from the CBOB service 114. The networked services 110, 112 may also need to register a business object type(s) that may be supported by the networked services 110, 112 but that is not registered in the CSLD 120.

In one example embodiment, the networked services 110, 112 may offer a user interface option for storing a business object or a list of business objects from the networked services 110, 112 into the CBOB service 114 in all of the available user interfaces that support the selected business object type. Optionally, a user may be able to select one or more users to whom a business object and/or business object data may be transferred and/or shared.

In one example embodiment, the networked services 110, 112 may offer a user interface option for inserting a business object and/or a list of business objects from the CBOB service 114 into all of the available user interfaces that support the selected business object type. Optionally, a user may be able to remove a business object or a list of business objects from the CBOB service 114 upon successful transfer of the business object or a list of business objects. For example, a user may be able to remove a business object from the CBOB service 114 upon successful insertion of the business object into one or more of the networked services 110, 112.

In one example embodiment, one or more networked services 110, 112 may map a business object structure(s) and data types from the internal format of the networked services 110, 112 to the format registered in the CSLD 120 (and vice versa).

The mapping may include a mapping by a first networked service, such as networked service 110, of an identifier (that may be set by another networked service, such as networked service 112) to a unique "external identifier" field in the internal data structure when importing a business object. If there is already a business object with the same external identifier, then the user may be prompted to determine if the existing object is to be replaced by the imported object.

In one example embodiment, the exporting and/or importing of business object data may be performed in accordance with the metadata model defined in the metadata model repository (described more fully above). The mapping between different business object type structures and data types may be based on the Enterprise Services Framework core services that may offer generic access to business object nodes and fields.

In one example embodiment, a user may select, for example, a business object in the networked service 110 for export to the CBOB service 114. The networked service 110 may contact the CSLD 120 to determine if the requested business object type is registered with the CBOB service 114. If the requested business object type is not registered with the CBOB service 114, the networked service 110 may register the requested business object type with the CBOB service 114. The networked service 110 may store the business object in the CBOB service 114 and a user may navigate to a target transaction in the networked service 112 to which the business object is to be passed. In one example embodiment, the networked service 112 may look up the cited business object type in the CSLD 120 and may retrieve the requested business object from the CBOB service 114. In one example embodiment, the networked service 112 may look up the cited business object type in the CSLD 120 and may retrieve a list of business objects stored on the CBOB service 114 that match the cited business object type. A user may select a business object instance from the cited list for transfer to the networked service 112. The user may indicate if the business object may be deleted upon successful insertion in the networked service 112.

Figure 4:
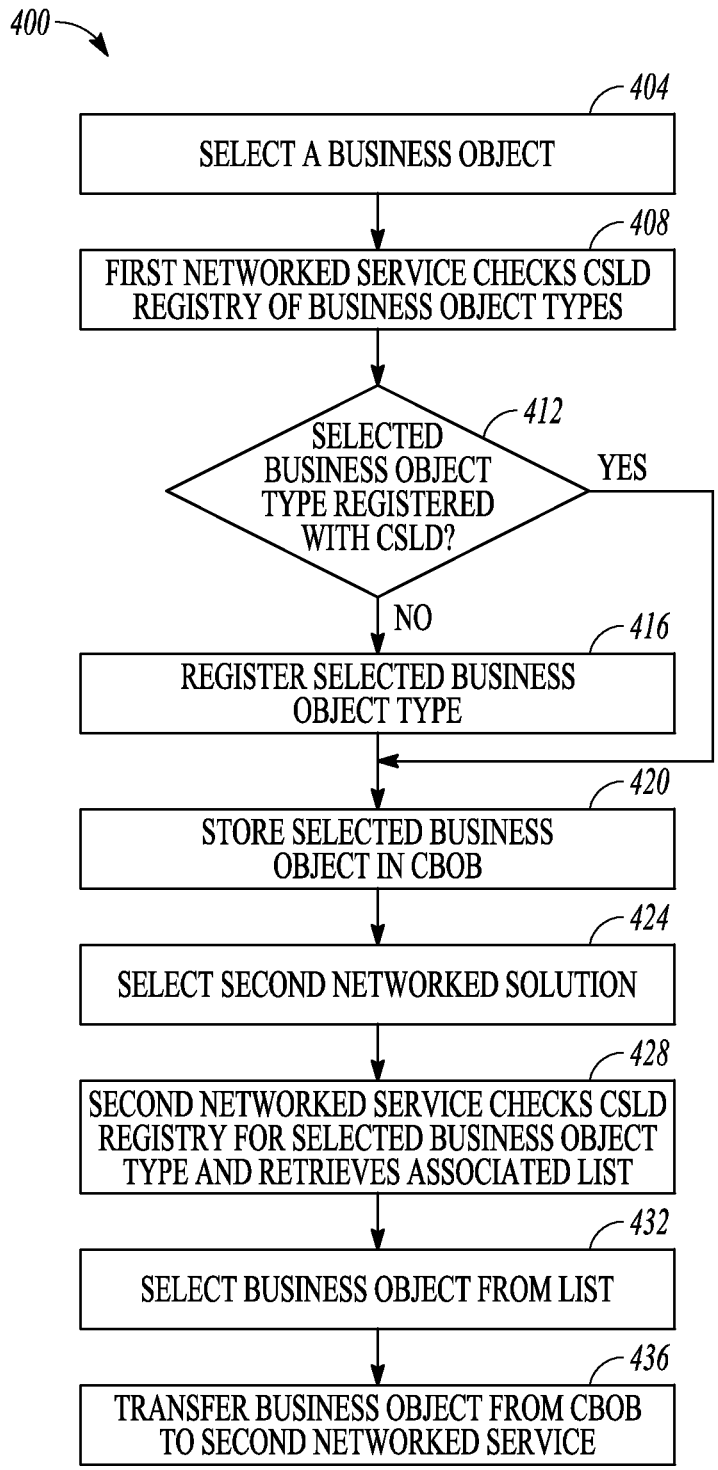
FIG. 4 is a flowchart illustrating an example method for transferring data between networked services and/or users, in accordance with an example embodiment.

FIG. 4 is a flowchart illustrating an example method 400 for transferring data between the networked services 110, 112 and/or users, in accordance an example embodiment.

A business object in a first networked service, such as the networked service 110, may be selected, for example, by a user for export to the CBOB service 114 (operation 404). The networked service 110 may contact the CSLD 120 to determine if the requested business object type is registered with the CBOB service 114 (operation 408). A test may be performed to determine if the requested business object type is registered with the CSLD 120 (operation 412). If the requested business object type is not registered with the CSLD 120, the networked service 110 may register the requested business object type with the CSLD 120 (operation 416). The networked service 110 may store the requested business object in the CBOB service 114 (operation 420). A second networked service, such as the networked solution 112, to which the business object is to be transferred may be selected by, for example, the user (operation 424). The networked service 112 may look up the cited business object type in the CSLD 120 and may retrieve a list of business objects that match the cited business object type (operation 428). A selection of a business object instance from the list of business objects may be obtained from the user (operation 432) and the business object instance may be transferred from the CBOB service 114 to the networked service 112 (operation 436).

In one example embodiment, the user may indicate if the business object may be deleted upon successful transfer of the business object instance to the second networked solution (a business object "move" instead of business object "copy").

Figure 5:
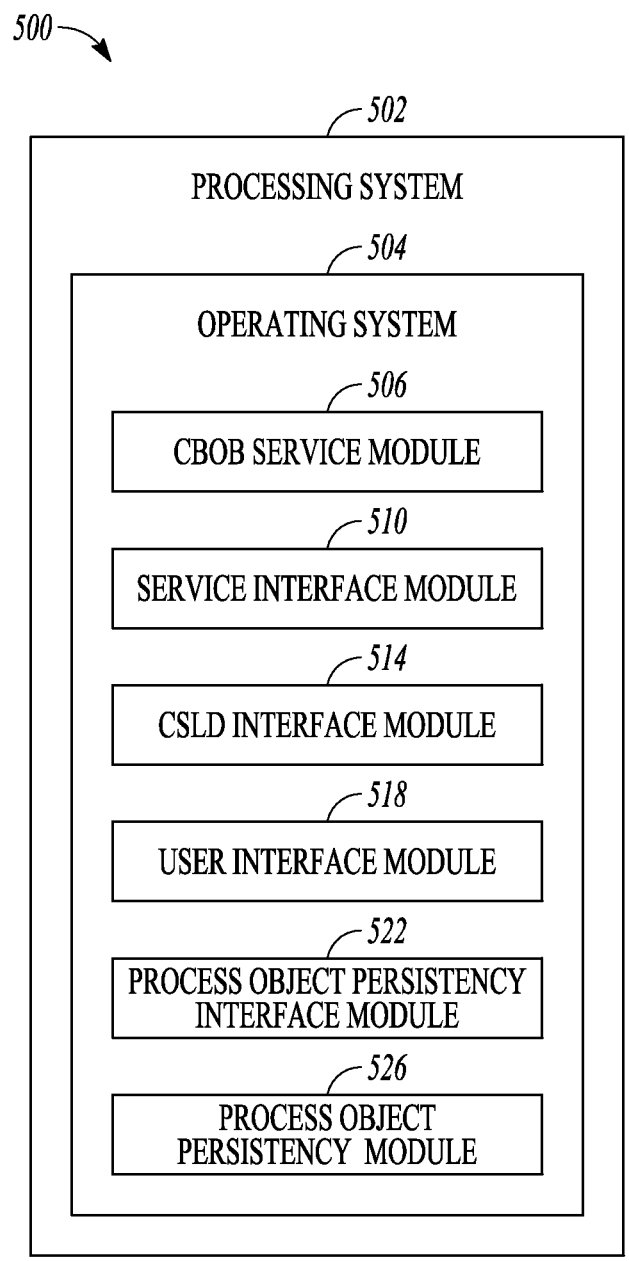
FIG. 5 is a block diagram of an example apparatus for transferring data between networked services and/or users, in accordance with an example embodiment.

FIG. 5 is a block diagram of an example apparatus 500 for transferring data between the networked services 110, 112 and/or users, in accordance an example embodiment. For example, the apparatus 500 may be used to implement the CBOB service 114 and may be used to transfer a business object between the networked service 110 and the networked service 112 and, accordingly, is described by way of example with reference thereto.

The apparatus 500 is shown to include a processing system 502 that may be implemented on a server, client, or other processing device that includes an operating system 504 for executing software instructions. In accordance with an example embodiment, the apparatus 500 includes a CBOB service module 506, a service interface module 510, a CSLD interface module 514, a user interface module 518, and a process object persistency interface module 522. In accordance with an example embodiment, the apparatus 500 may include a process object persistency module 526.

The CBOB service module 506 may manage the storage and/or transfer of a business object from one of the networked services 110, 112 and/or users to another of the networked services 110, 112 and/or users. The CBOB service module 506 may coordinate the storage and deletion of a business object in the process object persistency interface module 526.

The service interface module 510 may obtain a business object from the networked services 110, 112 and/or provide a business object to one or more of the networked services 110, 112.

The CSLD interface module 514 may provide for the participation of the CBOB service 114 in the registration of a business object type in the CSLD 120.

The user interface module 518 may enable a user to initialize and configure the CBOB service module 506.

The process object persistency interface module 522 may provide an interface for coordinating the storage and deletion of a business object in the process object persistency module 526 and/or external persistency module(s).

The process object persistency module 526 may temporarily store business objects to be transferred from one of the networked services 110, 112 and/or users to another of the networked services 110, 112 and/or users.

Figure 6:
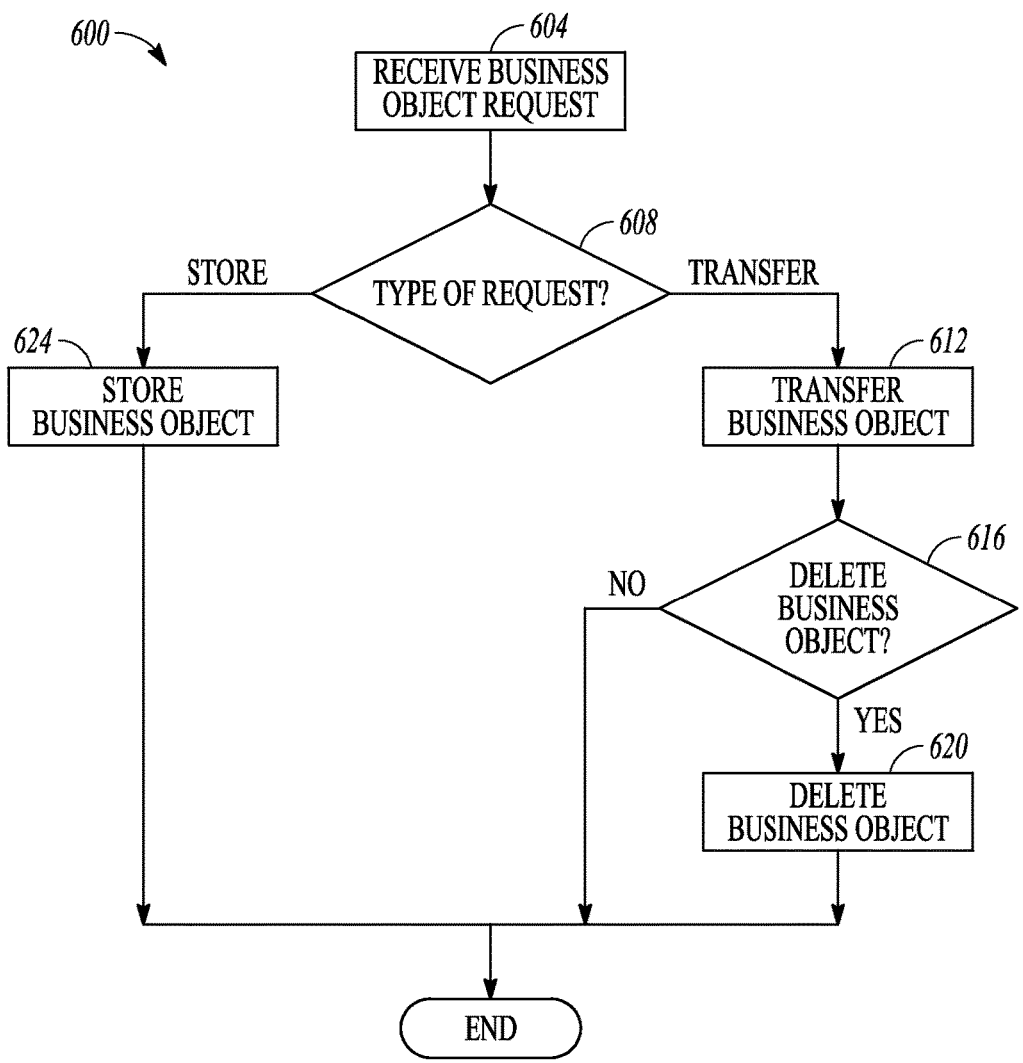
FIG. 6 is a flowchart illustrating an example method for providing a cloud business object broker service for transferring data between networked services and/or users, in accordance with an example embodiment.

FIG. 6 is a flowchart illustrating an example method 600 for providing the CBOB service 114 for transferring data between the networked services 110, 112 and/or users, in accordance an example embodiment. The method 600 may be performed, for example, by the CBOB service module 506.

A request to store or transfer a business object in the CBOB service 114 may be received (operation 604). A test may be performed to determine the type of request that has been received (operation 608). If the received request is a storage request, the identified object may be stored, for example, in the process object persistency module 526 (operation 624). If the received request is a transfer request, the requested object may be retrieved, for example, from the process object persistency module 526 and transferred to the requesting service and/or user (operation 612). A test may be performed to determine if the transferred object should be deleted from, for example, the process object persistency module 526 (operation 616). For example, a user may have indicated that a business object should be deleted after it has been transferred from the CBOB service 114. If the transferred object should not be deleted from the process object persistency module 526, the method may end. If the transferred object should be deleted from the process object persistency module 526, the object may be deleted from the process object persistency module 526 (operation 620) and the method may end.

Figure 7:
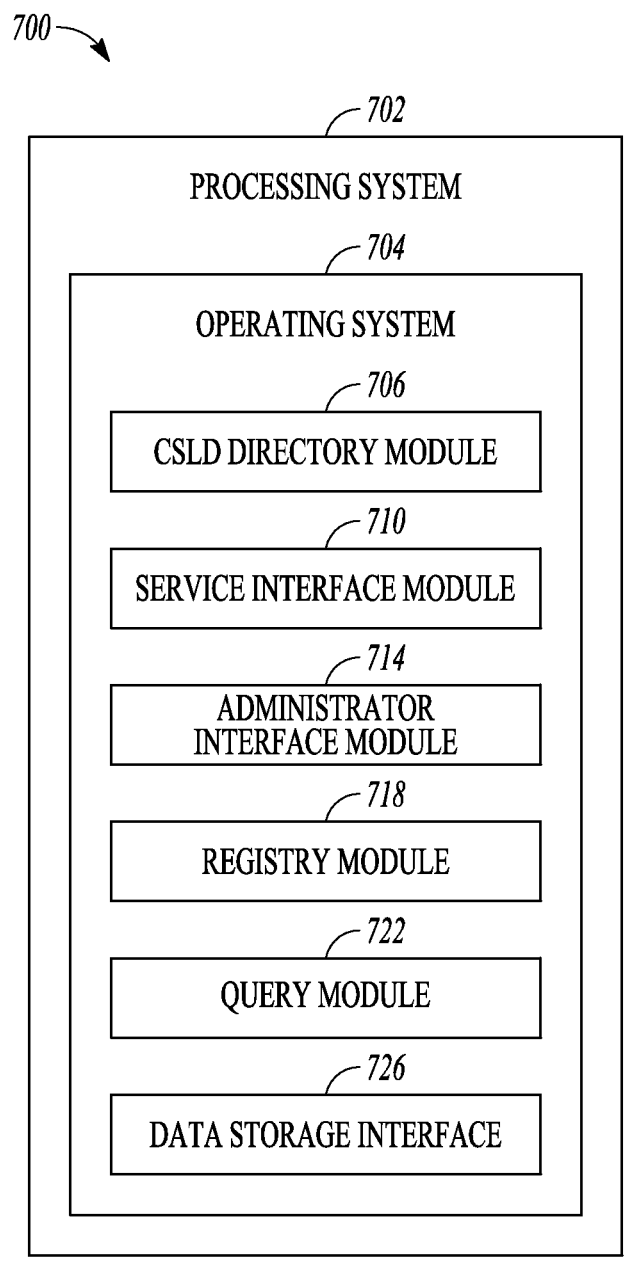
FIG. 7 is a block diagram of an example apparatus for maintaining a directory for networked services, in accordance with an example embodiment.

FIG. 7 is a block diagram of an example apparatus 700 for maintaining a directory for the networked services 110, 112, in accordance with an example embodiment. For example, the apparatus 700 may be used to implement the CSLD 120 and may maintain a directory of a plurality of business object types for transfer between the networked service 110 and the networked service 112 and, accordingly, is described by way of example with reference thereto.

The apparatus 700 is shown to include a processing system 702 that may be implemented on a server, client, or other processing device that includes an operating system 704 for executing software instructions. In accordance with an example embodiment, the apparatus 700 includes a CSLD directory module 706, a service interface module 710, an administrator interface module 714, a registry module 718, and a query module 722. In accordance with an example embodiment, the apparatus 700 may include a data storage interface 726.

The CSLD directory module 706 may maintain a directory of services and/or business objects types associated with the networked services 110, 112 and/or users of the networked services 110, 112.

The service interface module 710 may provide directory services to the networked services 110, 112 and/or users of the networked services 110, 112. For example, the service interface module 710 may provide a directory registration service for a business object type to the networked services 110, 112.

The administrator interface module 714 may provide access to the CSLD 120 for an administrator. For example, the administrator interface module 714 may enable an administrator to initialize and configure the CSLD directory module 706.

The registry module 718 may provide directory registration services to, for example, the networked services 110, 112 and/or users of the networked services 110, 112. For example, the registry module 718 may enable the networked services 110, 112 to register a business object type with the CSLD 120.

The query module 722 may provide a CSLD query service to the networked services 110, 112. For example, the query module 722 may enable the networked services 110, 112 to search the CSLD 120 for a business object type.

Figure 8:
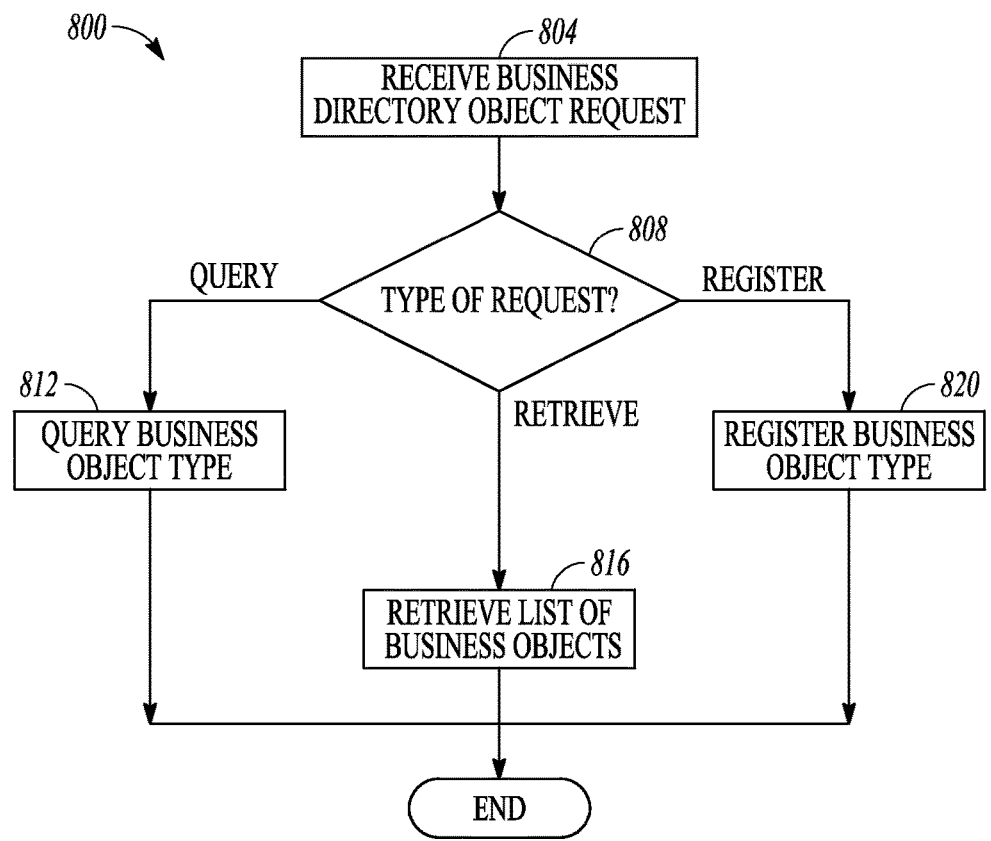
FIG. 8 is a flowchart illustrating an example method for providing a cloud solution landscape directory to networked services and/or users, in accordance with an example embodiment.

FIG. 8 is a flowchart illustrating an example method 800 for the CSLD 120, in accordance with an example embodiment. The method 800 may be performed, for example, by the CSLD directory module 706.

A business directory object request may be received (operation 804). A test may be performed to determine the type of request that has been received (operation 808).

If the received request is a query request, a search of the CSLD 120 for the specified business object type may be performed by the query module 722 and an indication of whether the specified business object type is registered with the CSLD 120 may be returned (operation 812).

If the received request is a retrieval request, a list of the business object instances corresponding to the specified business object type may be retrieved (operation 816). If the specified business object type is not registered with the CSLD 120, a null list may be returned.

If the received request is a registration request, the specified business object type may be registered with the CSLD 120 (operation 820).

Figure 9:
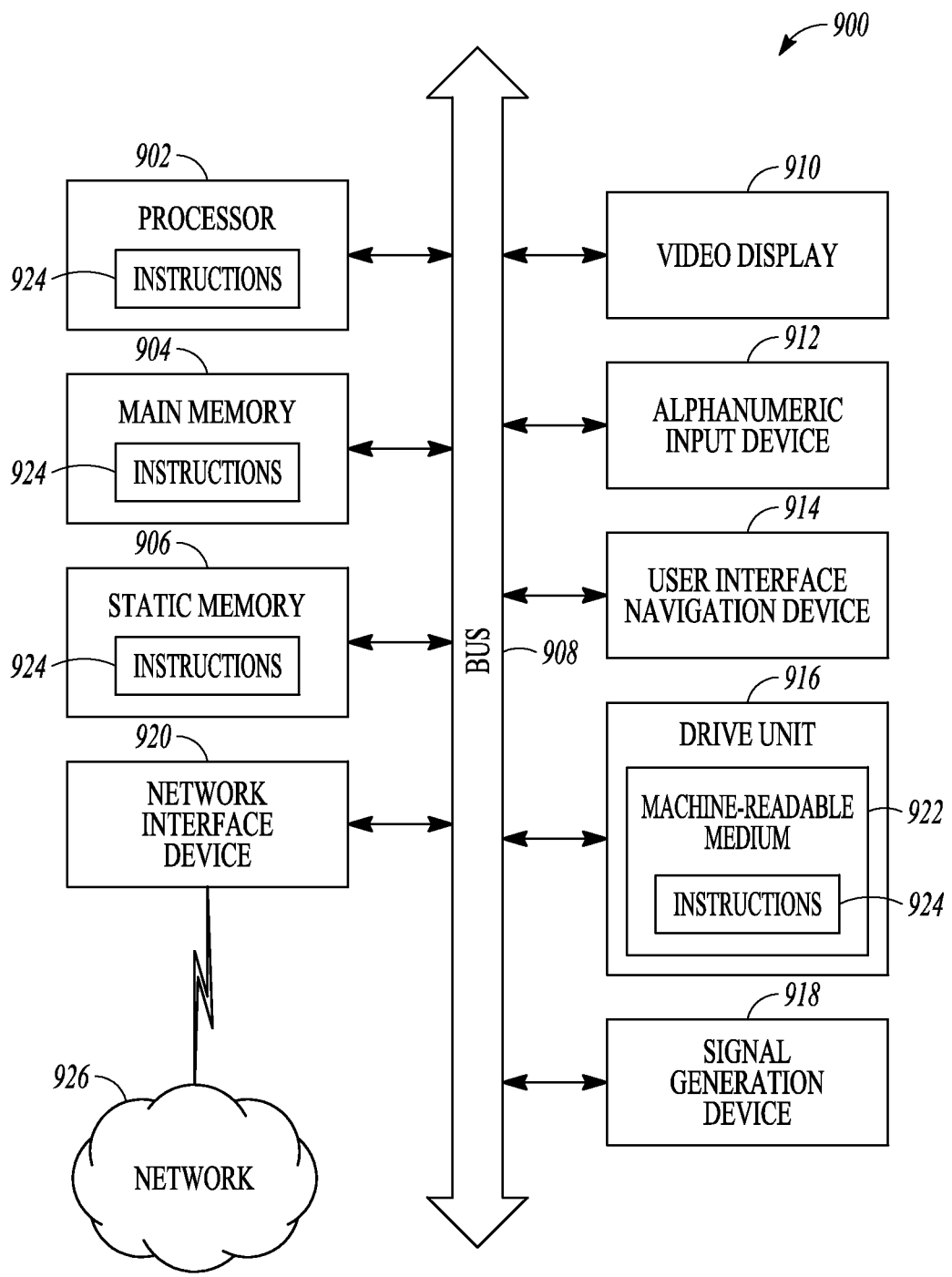
FIG. 9 is a block diagram of a computer processing system within which a set of instructions, for causing the computer to perform any one or more of the methodologies discussed herein, may be executed.

FIG. 9 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 900 includes processor 902 (e.g., a central processing unit (CPU), a graphics processing unit (GPU) or both), main memory 904 and static memory 906, which communicate with each other via bus 908. The processing system 900 may further include video display unit 910 (e.g., a plasma display, a liquid crystal display (LCD) or a cathode ray tube (CRT)). The processing system 900 also includes alphanumeric input device 912 (e.g., a keyboard), a user interface (UI) navigation device 914 (e.g., a mouse, touch screen, or the like), a disk drive unit 916, a signal generation device 918 (e.g., a speaker), and a network interface device 920.

The disk drive unit 916 includes computer-readable medium 922 on which is stored one or more sets of instructions and data structures (e.g., software 924) embodying or utilized by any one or more of the methodologies or functions described herein. The software 924 may also reside, completely or at least partially, within the main memory 904, static memory 906, and/or within the processor 902 during execution thereof by the processing system 900, the main memory 904, static memory 906, and the processor 902 also constituting computer-readable, tangible media.

The software 924 may further be transmitted or received over network 926 via a network interface device 920 utilizing any one of a number of well-known transfer protocols (e.g., Hypertext Transfer Protocol).

While the computer-readable medium 922 is shown in an example embodiment to be a single medium, the term "computer-readable medium" should be taken to include a single medium or multiple media (e.g., a centralized or distributed database, and/or associated caches and servers) that store the one or more sets of instructions 924. The term "computer-readable medium" shall also be taken to include any medium that is capable of storing, encoding or carrying a set of instructions 924 for execution by the computer and that cause the computer to perform any one or more of the methodologies of the present application, or that is capable of storing, encoding or carrying data structures utilized by or associated with such a set of instructions 924. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for transferring a business object from a first hardware-based networked service to a second hardware-based networked service, the method comprising:
   receiving, by a cloud business object broker executed at a computer processing system, a business object from the first hardware-based networked service, wherein the cloud business object broker is associated with a cloud database, and wherein the business object is of a first business object type;
   receiving, by a cloud solution landscape directory associated with the cloud database, a request from the second hardware-based networked service for a list of business objects stored by the cloud business object broker that are of the first business object type, wherein the list includes the business object;
   receiving, by the cloud business object broker and from the second hardware-based networked service, an indication of the business object; and
   transferring the business object by the cloud business object broker to the second hardware-based networked service.

2. The method of claim 1, further comprising deleting the business object from the business object broker after the transfer to the second hardware-based networked service.

3. The method of claim 1, wherein a format of the business object is mapped to a format of the cloud business object broker.

4. The method of claim 1, wherein a format of the business object is mapped from a format of the cloud business object broker to a format of the second hardware-based networked service.

5. The method of claim 1, wherein an identifier of the business object is mapped to a unique global identifier.

6. A computerized method for providing a service, the method comprising:
   selecting, using one or more hardware processors, a business object in a first data structure from a first hardware-based networked service;
   initiating a transfer of the selected business object to a cloud business object broker executed by a computer processing system and residing in a cloud database;
   registering a first business object type of the business object with a cloud solution landscape directory associated with the cloud database;

selecting a second hardware-based networked service; and initiating a transfer of the selected business object from the cloud business object broker to the second hardware-based networked service.

7. The method of claim 6, wherein the transfer of the business object to the second hardware-based networked service is performed via the cloud business object broker.

8. The method of claim 6, further comprising indicating that the business object is to be deleted after a transfer to the second hardware-based networked service.

9. An apparatus for providing a hardware-based network service, the apparatus comprising:

a processor;

memory to store instructions that, when executed by the processor cause the processor to perform operations comprising:

obtaining, by a cloud business object broker executed by the processor, a business object from a first hardware-based networked service, wherein the cloud business object broker is associated with a cloud database, and wherein the business object is of a first object type registered in a cloud solution landscape directory;

receiving, by the cloud business object broker and from a second hardware-based networked service, an indication of the business object, the indication of the business object received by the second hardware-based networked service from a cloud solution landscape directory associated with the cloud database; and transferring the business object to the second hardware-based network service.

10. The apparatus of claim 9, further comprising instructions that, when executed by the processor cause the processor to delete the business object from the business object broker after the transfer to the second hardware-based networked service.

11. The apparatus of claim 9, wherein a format of the business object is mapped to a format of the cloud business object broker.

12. The apparatus of claim 9, wherein a format of the business object is mapped from a format of the cloud business object broker to a format of the second hardware-based networked service.

13. The apparatus of claim 9, wherein an identifier of the business object is mapped to a unique global identifier.

14. An apparatus for providing a service, the apparatus comprising:

a processor;

memory to store instructions that, when executed by the processor cause the processor to perform operations comprising:

selecting a business object in a first data structure from a first hardware-based networked service; and initiating a transfer of the selected business object to a cloud business object broker executing at a computer processing system and residing in a cloud database;

registering a first business object type of the business object with a cloud solution landscape directory associated with the cloud database;

selecting a hardware-based second networked service; and initiating a transfer of the selected business object to the hardware-based second networked service.

15. The apparatus of claim 14, further comprising instructions that, when executed by the processor cause the processor to perform operations comprising indicating that the business object is to be deleted after a transfer to the second hardware-based networked service.

16. A non-transitory computer-readable medium embodying instructions that, when executed by a processor perform operations comprising:

obtaining, by a cloud business object broker, a business object from a first hardware-based networked service, wherein the cloud business object broker is associated with a cloud database, and wherein the business object is of a business object type;

receiving, by the cloud business object broker and from a second hardware-based networked service, an indication of the business object, the indication of the business object received by the second hardware-based networked service from a cloud solution landscape directory associated with the cloud database; and transferring the business object to the second hardware-based network service.

* * * * *